United States Patent
Ulrey et al.

(10) Patent No.: US 8,069,845 B2
(45) Date of Patent: Dec. 6, 2011

(54) FUEL HEATING DURING COLD START IN A DIRECT-INJECTION GASOLINE ENGINE

(75) Inventors: Joseph Norman Ulrey, Dearborn Heights, MI (US); Ross Dykstra Pursifull, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 12/901,624

(22) Filed: Oct. 11, 2010

(65) Prior Publication Data
US 2011/0162619 A1    Jul. 7, 2011

(51) Int. Cl.
*F01P 5/10* (2006.01)
*F02M 53/02* (2006.01)

(52) U.S. Cl. .................. 123/553; 123/549; 123/557

(58) Field of Classification Search ............... 123/456, 123/549, 553, 557
See application file for complete search history.

(56) References Cited

U.S. PATENT DOCUMENTS

| | | | | |
|---|---|---|---|---|
| 3,354,872 A * | 11/1967 | Gratzmuller | ................ | 123/557 |
| 3,762,378 A * | 10/1973 | Bitonti | .................... | 123/557 |
| 3,999,525 A * | 12/1976 | Stumpp et al. | ................ | 123/557 |
| 4,886,032 A * | 12/1989 | Asmus | ................... | 123/557 |
| 5,092,303 A * | 3/1992 | Brown | ....................... | 123/538 |
| 5,975,032 A | 11/1999 | Iwata | | |
| 7,415,975 B2 | 8/2008 | Lerner | | |
| 7,669,585 B2 | 3/2010 | Haag et al. | | |
| 7,849,839 B2 * | 12/2010 | Marriott | ..................... | 123/549 |
| 7,921,881 B2 * | 4/2011 | Zdroik et al. | ................. | 138/30 |
| 7,942,136 B2 * | 5/2011 | Lepsch et al. | ................ | 123/549 |
| 2007/0283927 A1 | 12/2007 | Fukumoto et al. | | |

FOREIGN PATENT DOCUMENTS

| EP | 1980740 A1 | 10/2008 |
|---|---|---|
| EP | 2194261 A1 | 6/2010 |

* cited by examiner

*Primary Examiner* — Erick Solis
(74) *Attorney, Agent, or Firm* — Julia Voutyras; Brooks Kushman P.C.

(57) ABSTRACT

It has been found that direct-injection gasoline engines emit particulate matter during the first 500 seconds of operation due to fuel impacting combustion chamber surfaces. To largely overcome the fuel penetrating to surfaces in the combustion chamber, the fuel may be heated. In one embodiment, engine coolant that is heated in the water jacket portions nearest exhaust ducts is provided directly to a tube in physical contact with the fuel rail. In some embodiments, the tube is provided with an electric heating element. If the coolant pump is turned off at the initial portions of a cold start, the electric heater raises the temperature of the fuel in the fuel rail. After engine coolant temperature raises, water, warm coolant is provided to the tube proximate the fuel rail and the heater is turned off.

20 Claims, 3 Drawing Sheets

FUEL HEATING DURING COLD START IN A DIRECT-INJECTION GASOLINE ENGINE

BACKGROUND

1. Technical Field

The present disclosure relates to reducing emission of particulate matter from a direct-injection gasoline engine.

2. Background Art

It has been found that particulate matter is emitted from gasoline direct-injection engines during the first 500 seconds of the Federal Test Procedure, i.e., when the engine is not yet warmed up. Particulate matter is presumed to be formed by fuel directly contacting surfaces of the combustion chamber, and in particular the piston tops (especially if they are oil cooled) as they warm up more slowly than the cylinder walls and the cylinder head.

SUMMARY

As it is complicated and energy intensive to preheat the combustion chamber surfaces prior to starting the engine, according to an embodiment of the present disclosure, the fuel is heated so that it vaporizes more readily when introduced in the combustion chamber so that little or none of the fuel is in liquid form by the time the fuel jet travels far enough away from the injector to impact combustion chamber surfaces.

A gasoline direct-injection engine is disclosed that has a fuel rail, fuel injectors coupled to the fuel rail and supplying fuel into engine cylinders. The engine also has an engine coolant circuit including a water pump to circulate coolant through a water jacket in the engine. A branch from the coolant circuit is provided to the fuel rail. In one embodiment, a portion of the water jacket proximate the exhaust ports and ducts leading out of the cylinders is coupled to the branch of the water jacket leading to the fuel rail. As the coolant in the water jacket in the vicinity of the exhaust is heated more rapidly during a cold start of the engine, the fuel rail will be heated rapidly during a cold start. Engine coolant is typically comprised of a mixture of water, ethylene glycol, and additives. The terms coolant and water are used in the disclosure to refer to any suitable liquid mixture used in the cooling circuit.

In some embodiments, an electrical heating element is disposed within the fuel rail to assist in heating the fuel beyond that from the coolant. In one embodiment, a thermostat is provided in the branch of the coolant circuit leading to the water jacket to prevent flow of coolant to the fuel rail when the coolant has not yet achieved a sufficiently high temperature. That is, the circumstance of the coolant provided to the fuel rail cooling the fuel, which has been heated by the electric heating element, is to be avoided. In one embodiment, the thermostat is a mechanical thermostat that is closed at a temperature below a predetermined temperature and is open at a temperature exceeding the predetermined temperature.

In embodiments with an electric heating element associated with the fuel rail, an electronic control unit is coupled to the electrical heating element. The electronic control unit causes the electrical heating element to be activated upon receiving an indication that the engine is about to be started. The electronic control unit is also coupled to a temperature sensor in contact with engine coolant and the electronic control unit causes the heating element to be deactivated when the temperature of the engine coolant exceeds a threshold temperature. In some alternatives, the thermostat is electrically controlled so that flow from the water jacket proximate the exhaust ducts to the fuel rail is allowed to flow based on the temperatures, estimated or measured, in the fuel rail and the engine coolant.

The indication that the engine is about to be started is one of: a key being inserted in an ignition switch, a vehicle door being opened, a vehicle door being unlocked, a vehicle door being opened and closed, a brake pedal being depressed, a key fob being within a predetermined distance from the vehicle, or a vehicle operator commanding engine crank. The activation of the electrical heating element may be further based on the temperature of the engine coolant being below a threshold temperature.

In some embodiments, the fuel injectors include electrical heaters electronically coupled to the electronic control unit and the electronic control unit activates the electrical heaters upon the indication that the engine is about to be started.

In one embodiment, the direct-injection, gasoline engine includes a fuel rail and an engine coolant circuit. The engine coolant circuit has a main water pump to circulate coolant; a water jacket in the engine in the cylinder head with a portion proximate an exhaust duct; and a fuel rail branch coupled substantially directly downstream of the water jacket portion proximate the exhaust duct wherein the fuel rail branch physically contacts the fuel rail. The engine also has temperature sensor coupled to the engine and an engine control unit (ECU) electronically coupled to the main water pump and the temperature sensor. The ECU deactivates the main water pump when a signal from the temperature sensor indicates that temperature of engine coolant within the engine is below a threshold temperature. In some embodiments, the engine also has an auxiliary pump coupled to the engine coolant circuit and electronically coupled to the ECU. The ECU commands the auxiliary pump to circulate flow in the coolant circuit based on temperature of the engine coolant within the engine being above the threshold temperature and the main water pump being deactivated. The exhaust duct is one of: an exhaust port immediately downstream an engine cylinder, an individual exhaust duct conducting exhaust gases from an exhaust port, and a combined exhaust duct into which individuals exhaust ducts are joined.

According to yet another embodiment, a gasoline direct injection engine, includes: fuel injectors coupled to engine cylinders, a fuel rail supplying fuel to the fuel injectors, electrical heating elements disposed within the fuel injectors, and an engine coolant circuit including a water pump to circulate engine coolant through a water jacket in the engine. A branch from the coolant circuit is provided to the fuel rail. A thermostat is disposed in the branch of the coolant circuit supplied to the fuel rail. The thermostat is a mechanical thermostat that is closed at a temperature below a predetermined temperature and is open at a temperature exceeding the predetermined temperature.

An electronic control unit is coupled to the electrical heating elements. The electronic control unit causes the electrical heating elements to be activated upon receiving an indication that the engine is about to be started. The electronic control unit is coupled to a temperature sensor in contact with engine coolant and the electronic control unit causes the heating element to be deactivated when the temperature of the engine coolant exceeds a threshold temperature. The electronic control unit is coupled to a temperature sensor in contact with engine coolant and the activation of the electrical heating element is further based on the temperature of the engine coolant being below a threshold temperature.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
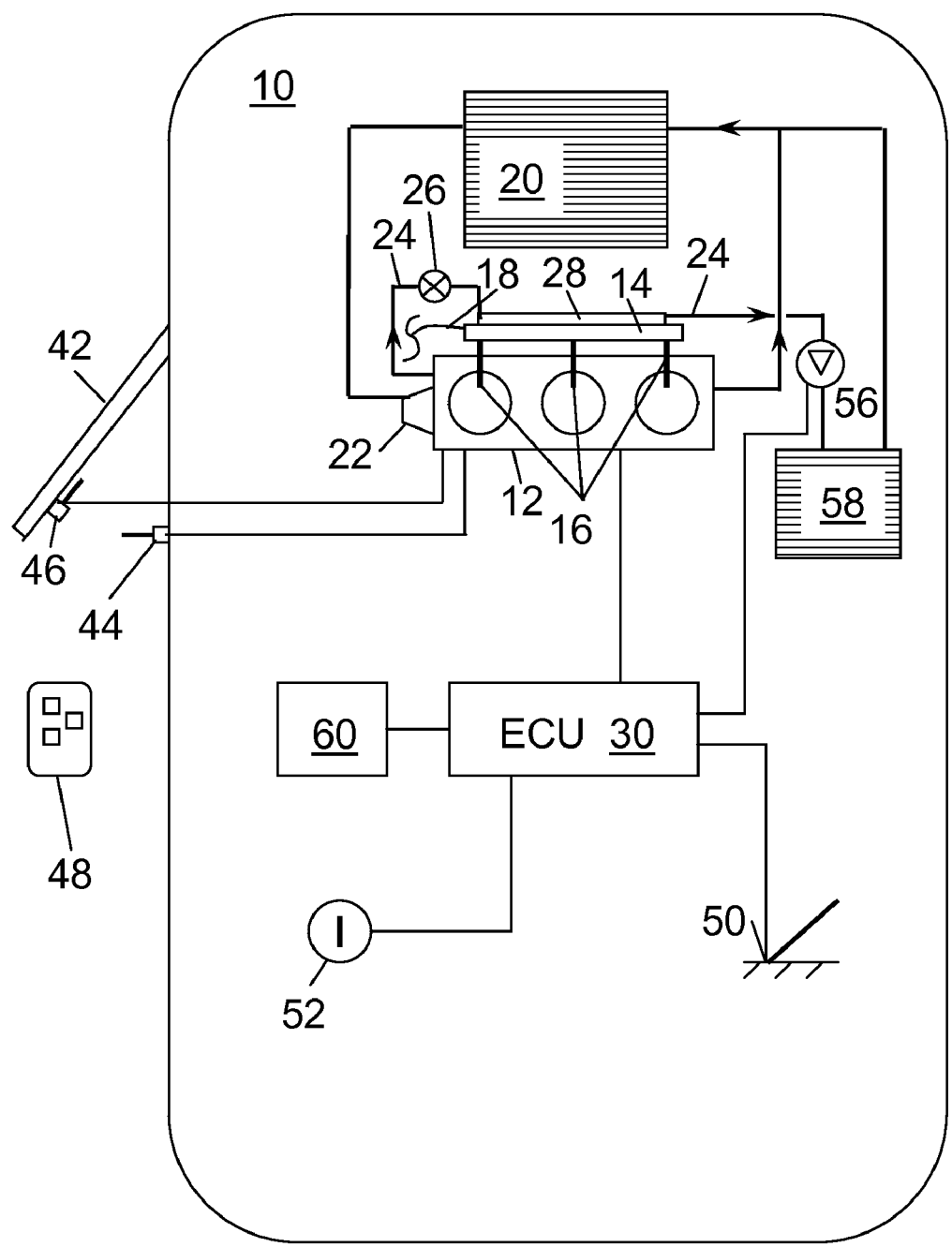
FIG. 1 is a schematic of a vehicle.

A schematic of a vehicle 10, according to an embodiment of the disclosure, is shown in FIG. 1. Engine 12 is a direct-injection gasoline engine in which the fuel injectors 16 spray directly into the combustion chamber. Alternatively, the engine is a port injection gasoline or a diesel engine. Pressurized fuel is supplied via a fuel line 18 to a fuel rail 14 which then feeds the fuel to injectors 16 for delivery into combustion chambers of engine 12. Engine 12 has a coolant circuit coupled to water jackets inside engine 12. The coolant circuit has a radiator 20 for transferring energy from engine coolant to the air and a main water pump 22, which may be driven directly by engine 12, for circulating coolant in the coolant circuit. Alternatively, a clutch (not shown) may be provided between pump 22 and engine 12 so that pump 22 can be deactivated, for example, during an engine cold start when cooling is not desired. In yet another alternative, pump 22 may be electrically driven to allow control of pump 22 completely independently of engine 12 operation.

A branch 24 is provided off the coolant circuit to provide coolant to a tube 28 proximate fuel rail 14. In various embodiments, tube 28 may: contact fuel rail 14 in a linear contact, be provided inside fuel rail 14, wrap around fuel rail 14, be integrally formed with fuel rail 14, etc. Tube 28 and fuel rail 14 form a liquid-to-liquid heat exchanger in any suitable manner. Branch 24 may include a thermostat 26, which is closed when the temperature at thermostat 26 is less than a predetermined set point temperature and open when the temperature exceeds the set point temperature. Thermostat 26 may be a wax motor thermostat with the opening temperature determined by the wax employed. Alternatively, thermostat 26 may be a wax motor thermostat with an electrical heater to provide a modicum of control over the temperature at which thermostat 26 opens. Branch 24 is shown coming off of the cooling jacket of engine 12 in FIG. 1, and in particular coming off from the vicinity of the exhaust ducts. Some engines have an integrated exhaust manifold in which the exhaust manifold is integrally cast with the cylinder head, such configuration facilitating providing coolant passages in the exhaust manifold portion of the cylinder head. Alternatively, the coolant can be provided to a separate exhaust manifold by providing coolant passages between the head and the exhaust manifold through the flange by which they are coupled.

In some vehicles, a stop-start strategy is employed such that engine 12 may be shut down during an extended idle period, such as at a stop light. However, to provide comfort to passengers in the vehicle compartment, an electrically-driven auxiliary water pump 56 is actuated to provide flow through an air-to-liquid heat exchanger (58), commonly called a heater core, during the shutdown period. In vehicles so equipped, coolant that exits tube 28 proximate to fuel rail 14. During a cold start, the main water pump 22 may be deactivated to allow a period during which the coolant in engine 12 is allowed to warm up. After that has occurred, auxiliary pump 56 may be activated to provide a trickle flow of coolant through engine 12 so that coolant in the cylinder head near exhaust ducts is provided directly to tube 28 that is proximate fuel rail 14.

An electronic control unit (ECU) 30 is provided on board vehicle 10. ECU 30 may be a single unit or be multiple units providing distributed computing. ECU 30 is coupled to various sensors and actuators. A non-exhaustive list includes: an engine coolant sensor 32, one or more electrical heating elements (not shown) in fuel rail 14 and electrical heating elements (not shown) in fuel injectors 16. In one embodiment, electrical heating elements are provided in both locations, in fuel injectors 16 and fuel rail 14. Alternatively, electrical heating elements are provided in only one of the two locations.

ECU 30 is coupled to other sensors and actuators 60. These may include, but are not limited to temperature sensors (for measuring ambient, engine coolant, oil, etc.), pressure sensors, humidity sensors, proximity sensors, and crank angle sensors as well as actuators for controlling auxiliary water pump 56, throttle valve position, EGR valve position, spark timing, injector opening, other valve positions, heaters, valve timing, etc. ECU 30 may comprise multiple processors, but is shown in FIG. 1 as a single unit for convenience.

According to an embodiment of the disclosure, electrical heating elements are activated when the engine is about to be started. It is desirable to have some lead time to provide sufficient time for heating the fuel that is about to be injected into the engine. An indication that engine 12 is to be started may be inferred or determined based on various activities of the vehicle operator. In one embodiment, it is inferred that engine 12 is about to be started based on opening of a door 42 of vehicle 10, in particular the driver's door. A pin switch 44, or other suitable switch, is depressed when door 42 is closed. Based on a signal from switch 44, the status of door 42 can be determined. In another embodiment, the status of a door lock 46 is used to infer that engine 12 may soon be cranked. In such embodiment, the unlocking of door lock 46 is considered an indication that operation of engine 12 will soon be commanded. In another embodiment, proximity of key fob 48 to vehicle 10 is used as an indicator of impending engine operation. In yet another embodiment, depression of brake pedal 50 is sensed and used as an indication of engine operation. In many vehicles, engine cranking is predicated on the brake pedal being depressed. In yet another embodiment, status of an ignition switch 52 is used to determine a desire for engine operation. Ignition switch 52 may be a key-operated switch. Alternatively, ignition switch 52 may be a push button operated switch that is only operable when an appropriate RFID (radio frequency identification) is within the vehicle. It is desirable to have some lead time to provide electrical heating to fuel in the injectors and/or in the fuel rail. However, indications of engine cranking, such as a door opening or the key fob being within a certain proximity of the vehicle, while providing more lead time than other options, are not certain indications of impending vehicle starting. If fuel heating is based on such indicators, the fuel at the fuel rail or injectors may be heated a few times when the engine is not subsequently started. Depression of the brake pedal is a more certain indicator that the engine will be cranked soon. However, it provides less lead time than other indicators. Clearly, there is a tradeoff between the various indicators and a suitable indicator may depend on the specific application.

Figure 2:
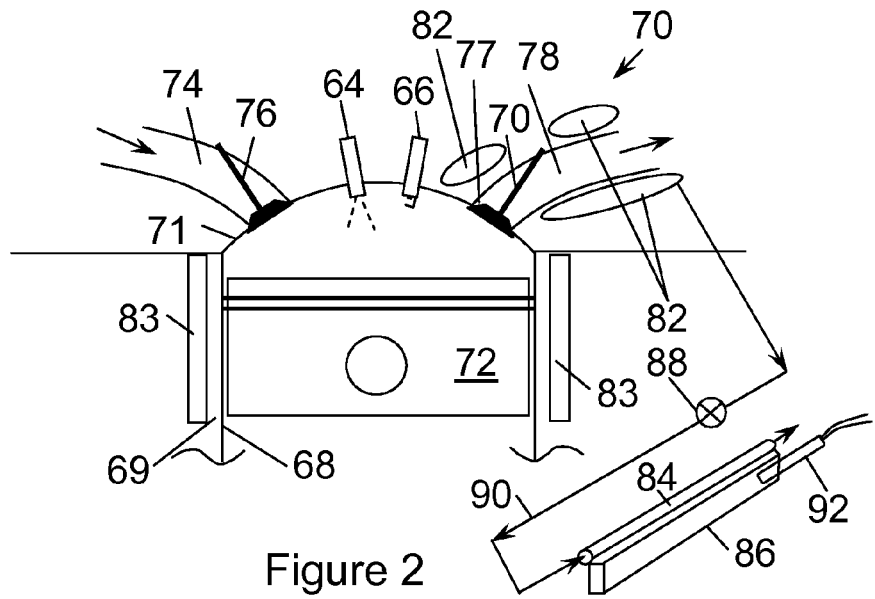
FIG. 2 is a schematic representation of a portion of a direct injection engine gasoline engine.

A schematic representation of a single cylinder 68 of a direct-injection gasoline engine 70 is shown in FIG. 2. Engine 70 includes a cylinder block 69 and a cylinder head 71. A piston 72 reciprocates in cylinder 68. Fresh air is supplied through an engine intake 74. Flow of fresh air into cylinder 68 is regulated by intake valve 76. Exhaust is expelled into an engine exhaust 78 and regulated by exhaust valve 80. Engine 70 has a cooling jacket provided in both the cylinder block and cylinder head. In FIG. 2, a first portion 82 of the cooling jacket located proximate engine exhaust port 77 and exhaust duct 78 is readily heated by exhaust gases passing through exhaust port 77 and exhaust duct 78. The portion of cooling jacket 82 is routed substantially directly to a tube 84 proximate a fuel rail 86. The cooling jacket includes other portions proximate the intake (not shown) and a portion 83 in cylinder block 69.

In the embodiment shown in FIG. 2, the intake manifold is integral with the cylinder head, thus it is not shown as a separate element. In an exhaust manifold, one or more exhaust ducts per cylinder may be joined into a single duct before exiting the exhaust manifold. Such joining of exhaust ducts occurs within the cylinder head with an integrated exhaust manifold. In the present disclosure, exhaust duct refers to any of an exhaust port directly downstream of the combustion chamber, individual exhaust ducts leading from exhaust ports, and combined exhaust ducts into which individual exhaust ducts are joined.

In embodiments with electrical heating element, a thermostat 88 nay be provided in a coolant line 90 that directs coolant from engine 70 to fuel rail 86. In such an embodiment, it may desirable for a thermostat to prevent flow of coolant very soon after a cold start when the coolant even in the vicinity of the exhaust duct is cool enough that it would remove energy from the electrically heated fuel rail rather than the desired energy addition.

Figure 3:
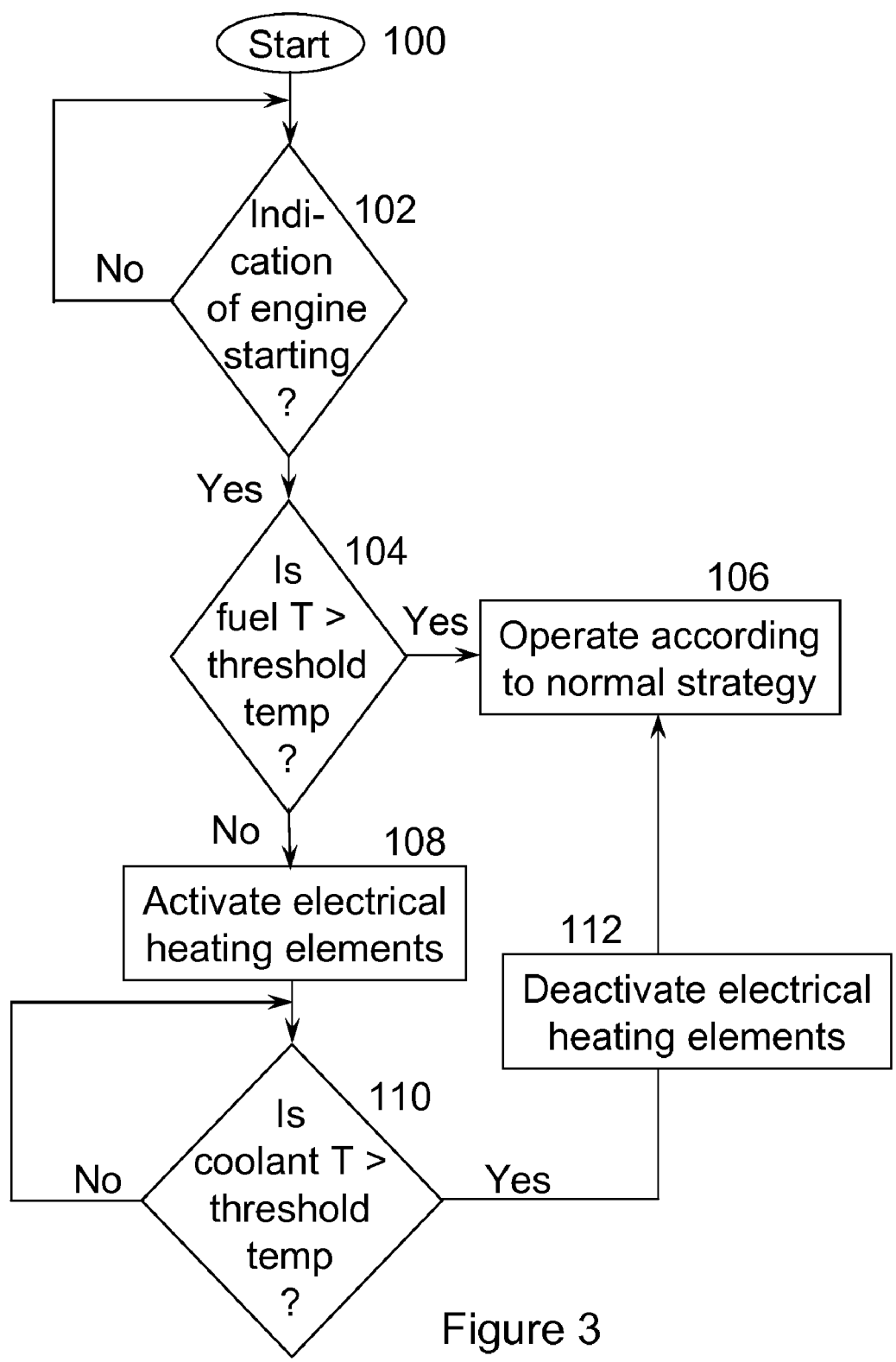

A flowchart of one algorithm of the present disclosure is shown in FIG. 3. The algorithm begins in 100. In 102, it is determined whether an indication of impending engine operation has been received. As described above, the indication may be based on any one or many alternatives. Or, the indication may be based on a combination of multiple indicators. If it is determined that engine cranking is impending, control passes to 104 in which the fuel temperature is compared to a threshold temperature. Fuel temperature may be based on a temperature sensor in the fuel system proximate the fuel rail/fuel injectors.

Alternatively, the fuel temperature may be based on other temperature sensors, such as engine coolant temperature and ambient air temperature, and a heat transfer model. If the fuel temperature is greater than a threshold temperature, it is an indication that the engine and/or the fuel is warm from prior operation and thus no additional heating of the fuel is indicated. Control, in that case, passes to 106 in which engine operation is controlled via the normal engine strategy. If the determined or inferred fuel temperature is less than the threshold temperature, control passes to 108 in which the electrical heating elements are activated. Control passes to decision block 110 in which the temperature of engine coolant is compared to a threshold temperature. If engine coolant is sufficiently warm, the electrical heating elements can be turned off and fuel heating is provided by engine coolant provided to a liquid-to-liquid heat exchanger proximate the fuel rail (fuel being one liquid and engine coolant being the other liquid). When the temperature exceeds the threshold temperature, the electrical heating elements are deactivated in block 112. Control then passes to block 106 for normal operation.

As described above, depending on the indicator used to determined engine starting, there may be some false indications of engine starting. According to an alternative embodiment, heating of the fuel by the electrical heating elements is turned off if after a predetermined time after receiving the indication of impending engine cranking that no such cranking has occurred.

Figure 4:
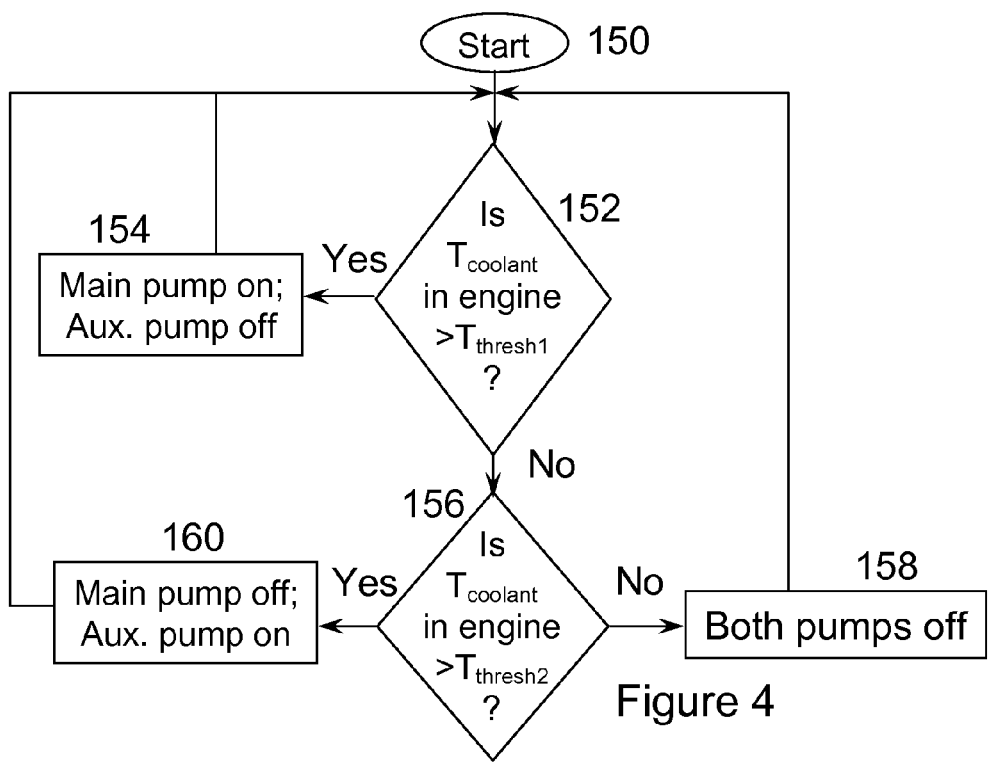
FIGS. 3 and 4 are flow charts of algorithms for heating fuel.

In some embodiments, main and auxiliary water pumps are provided to circulate coolant, with both of them being capable of being deactivated. In FIG. 4, an algorithm to control the pumps is shown that starts in 150. In decision block 152, it is determined whether the temperature of the coolant in the engine is greater than a first threshold. The temperature of coolant in the engine may be determined based on a combination of signals from temperature sensors and heat transfer models. If the temperature is above the threshold, control passes to block 154 in which the main pump is on and the auxiliary pump is off. If a negative result in 152, control passes to decision block to determine whether temperature of the coolant in the engines is greater than a second threshold. If not, both of the pumps are off. If a positive result in block 156, control passes to block 160 in which the main pump is deactivated and the auxiliary pump is activated. From blocks 154, 158, and 160 control passes to decision block 152. In some situations, particularly in a stop-start vehicle, the temperature may drop in the engine during a long duration such that continuous monitoring may be appropriate.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:
1. A gasoline direct injection engine, comprising:
a fuel rail;
fuel injectors coupled to the fuel rail and supplying fuel into engine cylinders;
an engine coolant circuit including a coolant pump to circulate coolant through a coolant jacket in the engine wherein a fuel rail branch from the coolant circuit is provided to the fuel rail and the fuel rail branch is coupled to a portion of the coolant circuit proximate an exhaust duct;
an electronic control unit (ECU) electronically coupled to the engine and the coolant pump; and
an auxiliary coolant pump coupled to the engine coolant circuit and electronically coupled to the ECU, the ECU commanding the auxiliary coolant pump to circulate flow in the engine coolant circuit based on temperature of engine coolant within the engine being above a first threshold temperature and below a second threshold temperature.

2. The engine of claim 1 wherein the fuel rail branch is provided coolant substantially directly from the portion proximate the exhaust duct.

3. The engine of claim 1 wherein the portion of the fuel rail branch in physical contact with the fuel rail is integral with the fuel rail.

4. The engine of claim 1, further comprising:
an electrical heating element disposed within the fuel rail; and
a thermostat disposed in the fuel rail branch of the coolant circuit supplied to the fuel rail.

5. The engine of claim 4 wherein the thermostat is a mechanical thermostat that is closed at a temperature below a predetermined temperature and is open at a temperature exceeding the predetermined temperature.

6. The engine of claim 4, wherein
the ECU is coupled to the electrical heating element, wherein the ECU causes the electrical heating element to be activated upon receiving an indication that the engine is about to be started.

7. The engine of claim 4 wherein the ECU is coupled to a temperature sensor in contact with engine coolant and the ECU causes the electrical heating element to be deactivated when the temperature of the engine coolant exceeds a threshold temperature.

8. A gasoline direct injection engine, comprising:
a fuel rail;
an engine coolant circuit;
an engine control unit (ECU) coupled to a main water pump and a temperature sensor; and
an auxiliary pump coupled to the engine coolant circuit and to the ECU, the ECU commanding the auxiliary pump to circulate flow in the engine coolant circuit based on temperature of engine coolant being above a threshold temperature and the main water pump being deactivated.

9. The engine of claim 8 wherein the ECU deactivates the main water pump when a signal from the temperature sensor indicates that temperature of engine coolant within the engine is below the threshold temperature.

10. The engine of claim 8, further comprising:
a fuel rail branch coupled substantially directly downstream of the water jacket portion proximate an exhaust duct wherein the fuel rail branch physically contacts the fuel rail.

11. The engine of claim 10 wherein the exhaust duct comprises at least one of: an exhaust port immediately downstream an engine cylinder, an individual exhaust duct conducting exhaust gases from an exhaust port, and a combined exhaust duct into which individuals exhaust ducts are joined.

12. The engine of claim 10 wherein at least a portion of the fuel rail branch is integral with the fuel rail.

13. The engine of claim 11 wherein the individual exhaust ducts and the combined exhaust duct comprise an exhaust manifold and the exhaust manifold is an integrated exhaust manifold.

14. A gasoline direct injection engine, comprising:
fuel injectors coupled to engine cylinders;
a fuel rail supplying fuel to the fuel injectors;
an engine coolant circuit, comprising:
a water pump;
a water jacket within the engine and having a portion proximate an exhaust duct of the engine; and
a branch of the coolant circuit proximate the fuel rail;
an electronic control unit (ECU) electronically coupled to the engine and the water pump; and
an auxiliary water pump coupled to the engine coolant circuit and electronically coupled to the ECU, the ECU commanding deactivation of the main water pump based on temperature of coolant in the engine being below a first threshold temperature and the ECU commanding the auxiliary water pump to circulate flow in the coolant circuit based on temperature of engine coolant within the engine being below the first threshold temperature and above a second threshold temperature.

15. The engine of claim 14 wherein the branch of the engine coolant circuit proximate the fuel rail is substantially immediately downstream of the portion proximate an exhaust duct of the engine.

16. The engine of claim 14, further comprising:
an electrical heating element disposed in the branch of the coolant circuit proximate the fuel rail; and
a thermostat disposed in the branch of the coolant circuit wherein the thermostat is a mechanical thermostat that is closed at a temperature below a predetermined temperature and is open at a temperature exceeding the predetermined temperature.

17. The engine of claim 16, wherein
the ECU is coupled to the electrical heating element, wherein the ECU causes the electrical heating element to be activated upon receiving an indication that the engine is about to be started.

18. The engine of claim 17 wherein the ECU is coupled to a temperature sensor in contact with engine coolant and the ECU causes the electrical heating element to be deactivated when a temperature of the engine coolant exceeds a threshold temperature.

19. The engine of claim 17 wherein receiving an indication that the engine is about to be started includes at least one of: a key being inserted in an ignition switch, a vehicle door being opened, a vehicle door being unlocked, a vehicle door being opened and closed, a brake pedal being depressed, a key fob being within a predetermined distance from the vehicle, and a vehicle operator commanding engine crank.

20. The engine of claim 17 wherein the ECU causes the electrical heating element to be activated upon a temperature of engine coolant being below a threshold temperature.

* * * * *